(12) United States Patent
Wang et al.

(10) Patent No.: US 11,578,980 B2
(45) Date of Patent: Feb. 14, 2023

(54) PREDICTIVE MAP GENERATION TECHNOLOGY

(71) Applicant: Intel Corporation, Santa Clara, CA (US)

(72) Inventors: Zhigang Wang, Beijing (CN); Ganmei You, Beijing (CN)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 16/650,905

(22) PCT Filed: Jan. 10, 2018

(86) PCT No.: PCT/CN2018/072019
§ 371 (c)(1),
(2) Date: Mar. 26, 2020

(87) PCT Pub. No.: WO2019/136617
PCT Pub. Date: Jul. 18, 2019

(65) Prior Publication Data
US 2020/0333142 A1      Oct. 22, 2020

(51) Int. Cl.
*G01C 21/20*   (2006.01)
*G05D 1/00*   (2006.01)
(Continued)

(52) U.S. Cl.
CPC ......... *G01C 21/206* (2013.01); *G05D 1/0088* (2013.01); *G05D 1/0221* (2013.01);
(Continued)

(58) Field of Classification Search
CPC .... G01C 21/206; G01C 21/20; G05D 1/0088; G05D 1/0221; G05D 1/0257; G06N 3/0445; G06N 3/08
See application file for complete search history.

(56) References Cited

U.S. PATENT DOCUMENTS 7,769,491 B2     8/2010   Fukuchi et al.
2007/0265741 A1  11/2007  Oi et al.
(Continued)

FOREIGN PATENT DOCUMENTS

CN     103558856 A       2/2014
WO     WO-2019068214 A1 *  4/2019  ............ G01S 17/00

OTHER PUBLICATIONS

Piewak et al.; Fully Convolutional Neural Networks for Dynamic Object Detection in Grid Maps; Computer Vision and Pattern Recognition (cs.CV), arXiv:1709.03139 [cs.CV]; Sep. 10, 2017 (Year: 2017).*

(Continued)

*Primary Examiner* — Michael J Zanelli
(74) *Attorney, Agent, or Firm* — Jordan IP Law, LLC

(57) ABSTRACT

Systems, apparatuses and methods may provide for technology that generates a sequence of predictive maps based on a sequence of historical maps and overlays the sequence of predictive maps on one another to obtain a map overlay. The technology may also apply an attenuation factor to the map overlay. In one example, the map overlay includes a grid of cells and each cell includes an occupation probability in accordance with the attenuation factor.

24 Claims, 5 Drawing Sheets

(51) Int. Cl.
    *G05D 1/02*      (2020.01)
    *G06N 3/04*      (2006.01)
    *G06N 3/08*      (2006.01)

(52) U.S. Cl.
    CPC ......... *G05D 1/0257* (2013.01); *G06N 3/0445* (2013.01); *G06N 3/08* (2013.01)

(56) References Cited

U.S. PATENT DOCUMENTS

| | | |
|---|---|---|
| 2016/0069690 A1 | 3/2016 | Li et al. |
| 2019/0102668 A1* | 4/2019 | Yao ................. B60W 10/20 |

OTHER PUBLICATIONS

International Search Report and Written Opinion for International Patent Application No. PCT/CN2018/072019, dated Oct. 18, 2018, 9 pages.

Colah, "Understanding LSTM Networks," blog entry, posted on Aug. 27, 2015, 9 pages.

Graves et al., "Multi-Dimensional Recurrent Neural Networks," IDSIA, Feb. 11, 2013, 10 pages, Manno, Switzerland.

Hochreiter et al., "Long Short-Term Memory," Neural Compuation 9 (8): 1735-1780, 1997, 32 pages.

Shi et al. "Convolutional LSTM Network: A Machine Learning Approach for Precipitation Nowcasting," Sep. 19, 2015, 12 pages.

Sutskever et al. "Sequence to Sequence Learning with Neural Networks," Sep. 10, 2014, 9 pages.

* cited by examiner

PREDICTIVE MAP GENERATION TECHNOLOGY

CROSS REFERENCE TO RELATED APPLICATIONS

The present application is a U.S. National Phase Patent Application, which claims the benefit of priority to International Patent Application No. PCT/CN2018/072019 filed on Jan. 10, 2018.

TECHNICAL FIELD

Embodiments generally relate to automated navigation. More particularly, embodiments relate to predictive map generation technology in automated navigation systems.

BACKGROUND

Autonomous robots may use a navigation software stack to control the movement of the robot from one place to another. The navigation software stack solutions may simply adjust the pose and speed of the robot when the distance between the robot and an obstacle (e.g., person, furniture, wall, etc.) is less than a preset safety distance. Such an approach may be difficult to control and may involve the use of high frequency sensors to ensure safety. Accordingly, conventional autonomous robots may be relatively expensive, which may in turn hinder widespread adoption of the technology.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
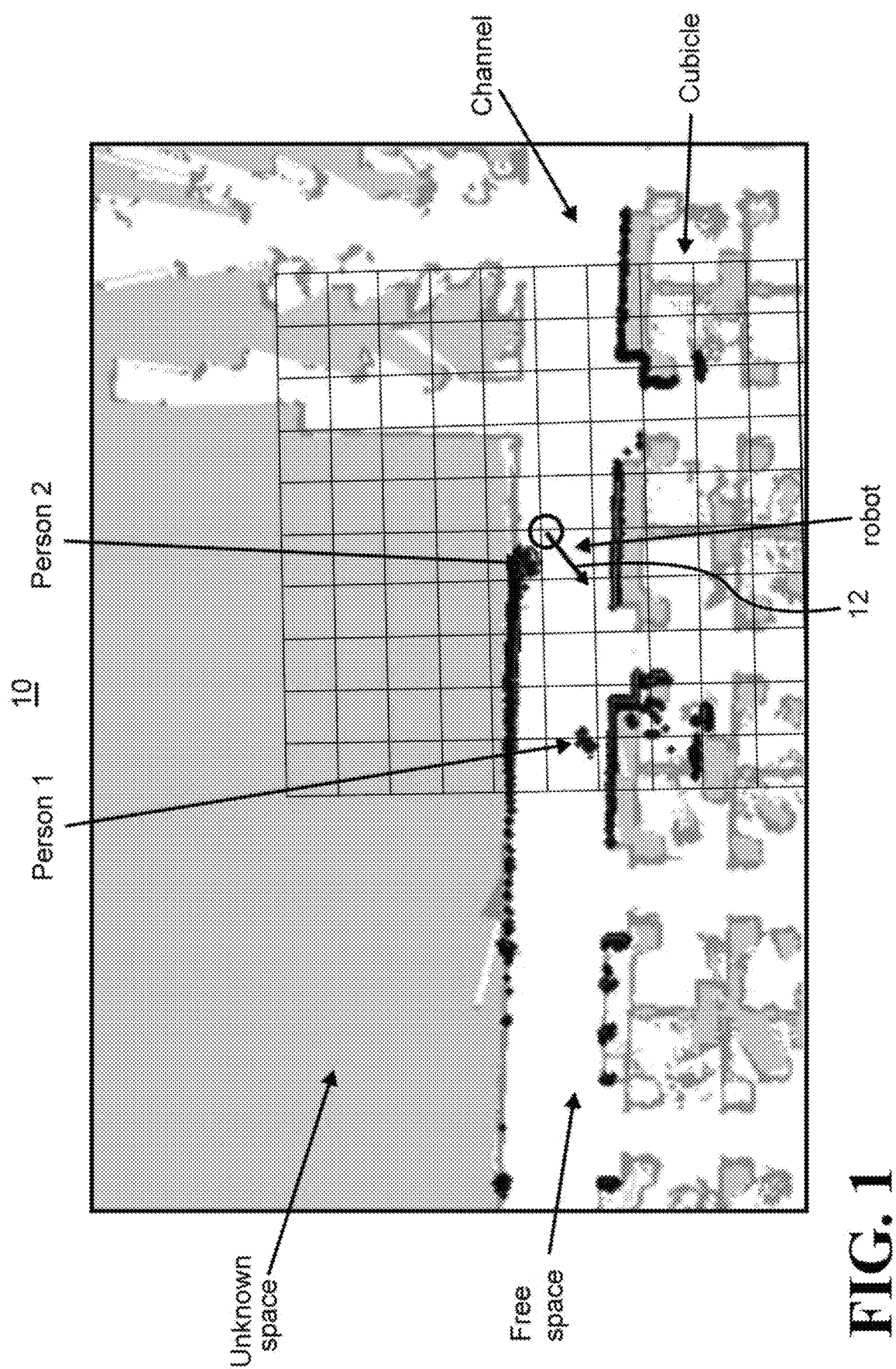
FIG. 1 is an illustration of an example of a map according to an embodiment.

Turning now to FIG. 1, a map 10 of an environment (e.g., office space) is shown. The map 10 may be generated by an imaging and/or ranging system such as, for example, a light detection and ranging (LIDAR) system. For example, the LIDAR system, which may be incorporated into a robot, might illuminate the environment with pulsed laser light and measure the reflected pulses with one or more sensors. Differences in laser return times and wavelengths may then be used to generate the map 10, which may include two-dimensional (2D) or three-dimensional (3D) information. In the illustrated example, the map 10 indicates that the environment includes the robot (shown as a circle), multiple people ("Person 1," "Person 2"), an unknown space (e.g., previously unexplored by the robot), a free space, a channel, multiple cubicles, and so forth. The map 10 also indicates the posture of the robot with an arrow 12. As will be discussed in greater detail, multiple instances of the map 10 may be used to generate a sequence of historical maps, which may in turn be used in an unsupervised learning procedure to generate a sequence of predictive maps.

Figure 2:
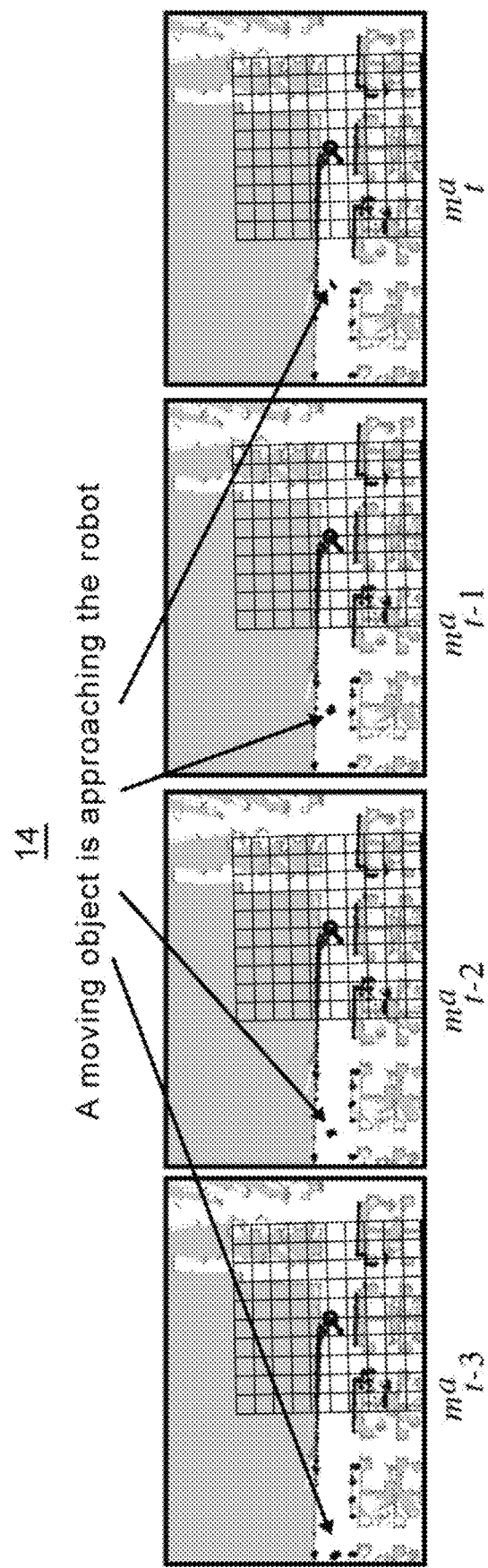
FIG. 2 is an illustration of an example of a sequence of historical maps according to an embodiment.

FIG. 2 shows a spatiotemporal sequence 14 of historical (e.g., "accurate") maps. In the illustrated example, a moving object is approaching the robot and an accurate map of the environment at time t is represented by $m^a_t$. Thus, for a length k the series expression $m^a_{t-(k-1)}$, $m^a_{t-(k-a)}$, ..., $m^a_t$ may generally indicate the spatiotemporal sequence 14 over time. Of particular note is that humans may readily predict that there is a moving object approaching the robot based on the spatiotemporal sequence 14. The use of unsupervised learning (e.g., neural networks) may enable the robot to also make such a prediction automatically.

Figure 3:
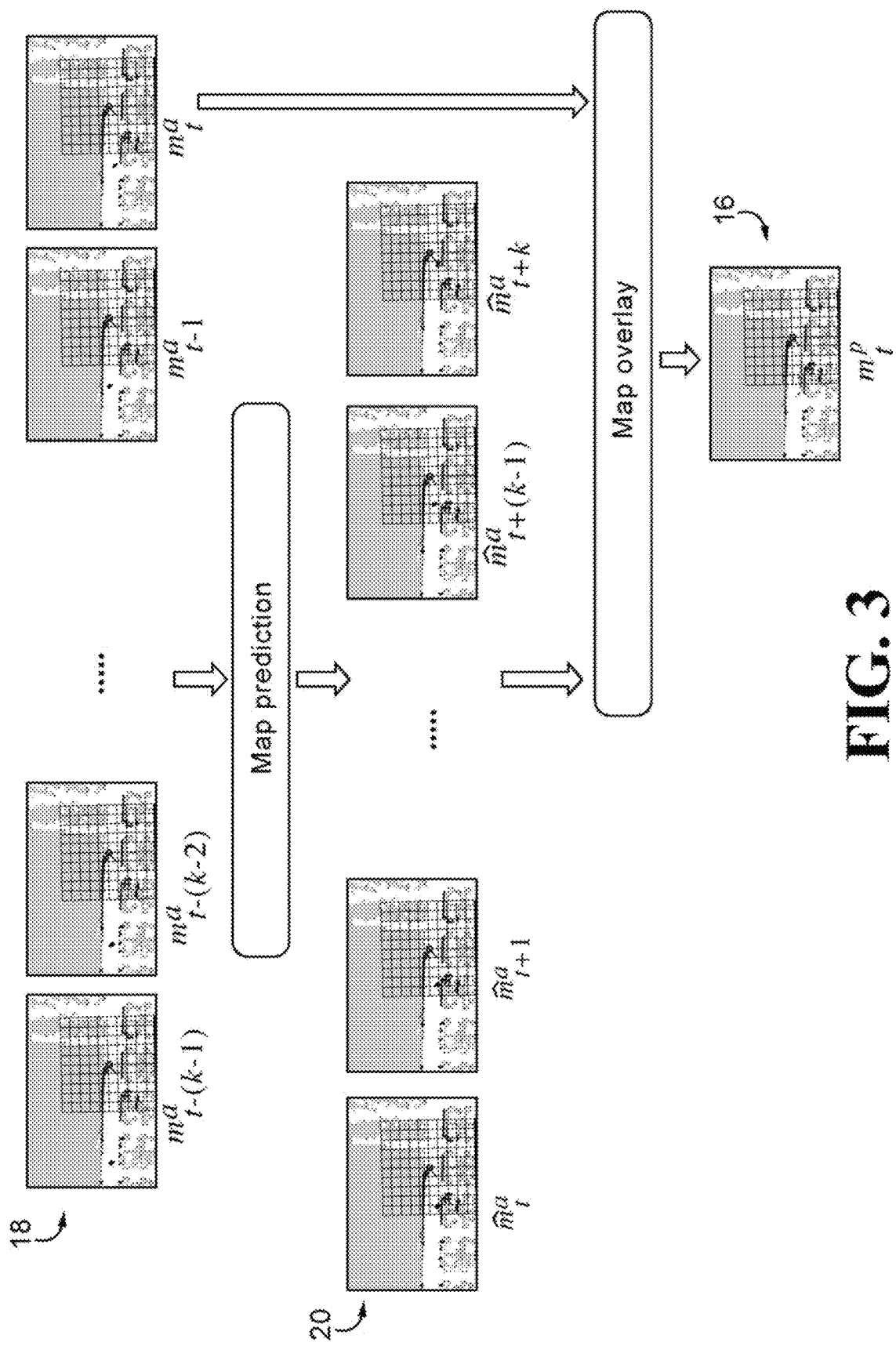
FIG. 3 is an illustration of an example of a map overlay according to an embodiment.

FIG. 3 shows an approach to generating a map overlay 16 (e.g., $m^p_t$). In the illustrated example, a sequence 18 of historical maps is used to generate a most likely k length sequence 20 of predictive maps (e.g., $\hat{m}^a_{t+1}$, $\hat{m}^a_{t+2}$, ..., $\hat{m}^a_{t+}$). The sequence 20 of predictive maps may then be overlaid on another to obtain the map overlay 16. As will be discussed in greater detail, applying an attenuation factor to the map overlay 16 may result in the map overlay 16 including a grid of cells, with each cell including an occupation probability in accordance with the attenuation factor. The attenuation factor may be seen in the illustrated example as the moving object gradually turning to lighter shades of gray.

Figure 4:
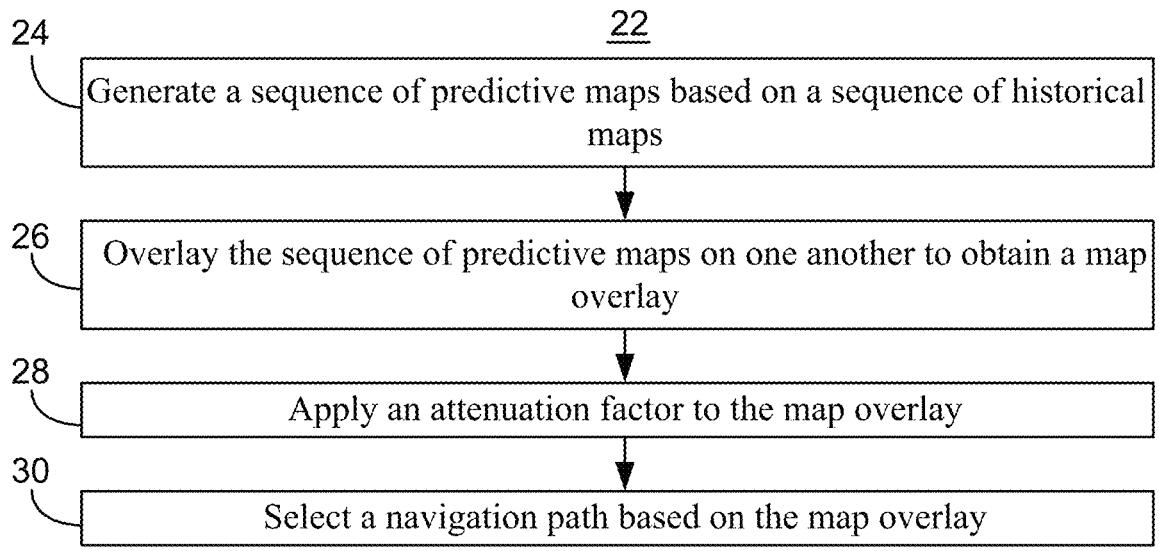
FIG. 4 is a flowchart of an example of a method of operating an autonomous mobile system according to an embodiment.

FIG. 4 shows a method 22 of operating an autonomous mobile system. The method 22 may generally be implemented in a robot such as, for example, the robot shown in FIGS. 1-3, already discussed, in a vehicle, and so forth. More particularly, the method 22 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 22 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 24 provides for generating a sequence of predictive maps based on a sequence of historical maps. Block 24 may include training a neural network such as, for example, a long short-term memory (LSTM, e.g., a special type of recurrent neural network/RNN structure) neural network, on the sequence of historical maps. The use of a neural network may enable an unsupervised learning of where obstacles will be in the future given accurate map data from the past. For example, certain social behavior norms such as, for example, passing other people on the right/left, may be automatically incorporated into the predictions. Block 26 may overlay the sequence of predictive maps on one another to obtain a map overlay. An attenuation factor may be applied to the map overlay at block 28, so that the map overlay includes a grid of cells and each cell includes an occupation probability (e.g., probability of the cell being occupied) in accordance with the attenuation factor. The illustrated method 22 also provides for selecting a navigation path (e.g., real-time robot navigation path) at block 30 based on the map overlay. Block 30 may include selecting cell locations having an occupation probability that is below a particular threshold. Accordingly, the illustrated method 22 enhances the performance of autonomous mobile systems by automatically learning optimal navigation paths over time and in changing environments.

Figure 5:
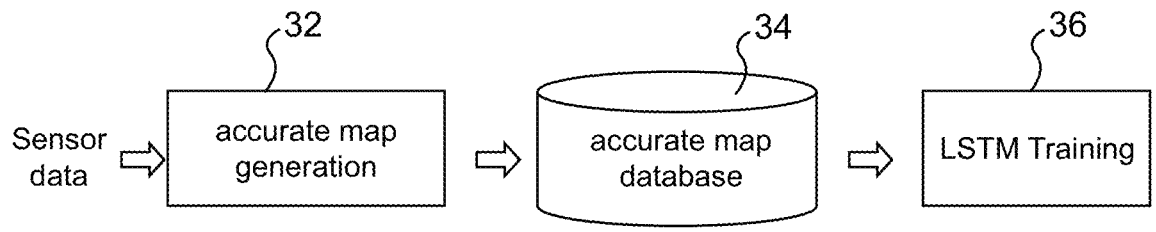
FIG. 5 is an illustration of an example of the use of an accurate map dataset to train a long short-term memory (LSTM) neural network according to an embodiment.

Turing now to FIG. 5, an LSTM approach is shown. In the illustrated example, sensor data is provided to an accurate map generator 32, which populates an accurate map dataset 34. The accurate map dataset 34 may be used to train an LSTM neural network architecture 36. More particularly, sensors such as LIDAR sensors may continually generate data after the robot is deployed in a new environment. The sensor data may be used by the accurate map generator 32 to generate accurate maps. The functionality of accurate map generation may be similar to the functionality of mapping solutions such as, for example, simultaneous localization and mapping (SLAM) solutions. Accordingly, existing modules may be leveraged to generate accurate maps as described herein.

If there is preexisting information about the environment, the maps may be evolved based on application/realistic rules. For example, the life cycle of the obstacle may be extended in accurate map generation when it is determined that LIDAR is unable to see the obstacles. Thus, every instance in the dataset 34 may be a sequence of accurate maps of length 2 k (k maps for input and k maps for ground truth prediction). As data is accumulated, the LSTM neural network architecture 36 may be trained by minimizing the cross-entropy loss between predicted maps and ground truth using back-propagation through time (BPTT) and "RMSProp," discussed in greater detail below.

Training the LSTM neural network (e.g., the "LSTM") may determine different weights in the LSTM that are used to predict the output accurately based on the input. Initially, all weights in the LSTM may be initialized randomly. BPTT may operate as follows.

1. A sequential input (k maps for input) may be propagated through the LSTM to obtain a sequential output.
2. The predicted output may be compared to the expected output (k maps for ground truth prediction), which enables the error E to be calculated.
3. Calculate the derivatives $\partial E/\partial w$ of the error with respect to each network weight.

4. Based on the derivatives, adjust the weights up or down, whichever direction decreases error. The formula, $w_{t+1} = w_t + \alpha * \partial E/\partial w_t$ may be used.
5. Repeat the above procedure until the error is less than expected.

Time, in BPTT, may simply be expressed by a well-defined, ordered series of calculations linking one time step to the next (e.g., back propagation).

In operation 4, alpha is the learning rate. If the learning rate is very small, convergence may be very slow. By contrast, a large alpha may lead to divergence. RMSProp is a procedure that may solve the problem of how to set learning rate. In one example, the procedure scales alpha for each parameter automatically according to the history of gradients. As a result, when the gradient is very large, alpha is reduced and vice-versa.

Thus, input and ground truth data may be collected in a new environment automatically and without any human intervention. In other words, the illustrated training process may be unsupervised learning. Accordingly, the proposed solution may adapt to different environments automatically.

More particularly, the task of map prediction based on previous observations may involve the following expression:

$$\hat{m}_{t+1}^a, \hat{m}_{t+2}^a, \ldots ,$$

$$\hat{m}_{t+k}^a = \underset{m_{t+1}^a, m_{t+2}^a \ldots m_{t+k}^a}{\operatorname{argmax}} p(m_{t+1}^a, m_{t+2}^a, \ldots, m_{t+k}^a \mid m_{t-(k-1)}^a, m_{t-(k-a)}^a, \ldots, m_t^a)$$

This issue may be addressed by viewing the problem from a machine learning (ML) perspective. According to an underlying deep learning (DL) approach, if a reasonable end-to-end model and sufficient training data is available, the problem may be solvable. The map prediction issue satisfies the data requirement because the collection of large amounts of map data may be performed by a suitable navigation software stack. Additionally, deep learning techniques and LSTM neural networks, may be stable and powerful enough to model sequence predictions.

A basic LSTM neural network may input and output a one-dimensional (1D) vector. There are many variants, however, of LSTM that support high dimension data. One approach is to use convolutional LSTM, although other approaches may be used. A key equation of a convolutional LSTM cell may be:

$$i_t = \sigma(W_{xi} * x_1 + W_{hi} * H_{t-1} + W_{ci} \circ C_{t-1} + b_i)$$

$$f_t = \sigma(W_{fi} * x_1 + W_{hf} * H_{t-1} + W_{cf} \circ C_{t-1} + b_f)$$

$$C_t = f_t \circ C_{t-1} + i_t \circ \tan h(W_{xc} * x_1 + W_{hc} * H_{t-1} + b_c)$$

$$O_t = \sigma(W_o * x_1 + W_{ho} * H_{t-1} + W_{co} \circ C_{t-1} + b_o)$$

$$H_t = O_t \circ \tan h(C_t)$$

Where it is the input gate at time t, $f_t$ is the forget gate at time t, $C_t$ is the memory cell at time t, $O_t$ is the output gate at time t, $H_t$ is the final state at time t, * denotes the convolution operator, and ∘ denotes the Hadamard product.

A map overlay of the predictive map may be generated based on an accurate map at time t and the predicted accurate map sequence:

$$m_t^p = \text{map\_overlay}(m_t^a, \hat{m}_{t+1}^a, \hat{m}_{t+2}^a, \ldots, \hat{m}_{t+k}^a)$$

Rather than a simple overlay of all data into one map, the map overlay described herein may prevent the consideration of obstacles that do not exist. Accordingly, the free space available to the robot may be larger and the robot is easier to control as described herein. As already noted, the navigation stack may treat the map as a grid of occupation probabilities. Thus, when the probability of a grid cell is less than a certain threshold, the cell may not be regarded as containing an obstacle (e.g., the same as other cells whose occupation probability is zero). A navigation plan may therefore be selected to yield the minimal probability of collision.

Moreover, an attenuation factor may be introduced to reduce the occupation probability over the time of prediction. The map overlay may therefore determine a predictive map $m^p_t$ that guides navigation to avoid many obstacles at the same time and in advance. Assuming that m(i, j) is the occupation probability of the grid (i, j) for each grid cell, the following may be determined:

$$m^p_t(i,j) = \max(m^a_t(i,j)*f(0), \hat{m}^a_{t+1}(i,j)*f(1), \hat{m}^a_{t+2}(i,j)*f(2), \ldots, \hat{m}^a_{t+k}(i,j)*f(k))$$

Here f(k) is the aforementioned attenuation factor, which may be an arbitrary monotonic reduction function that satisfies f(0)=1 and f(k)≥0. Valid examples include, but are not limited to:

Example 1: $f(k) = c^k$, $0 < c < 1$

Example 2

$$f(k) = \frac{1}{1+k}$$

Figure 6:
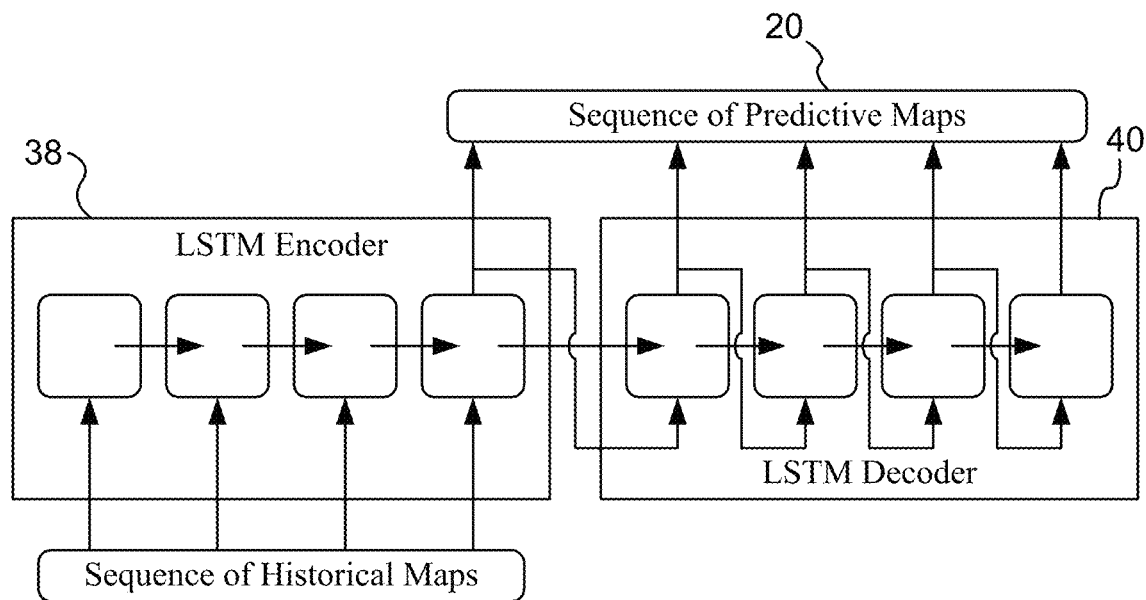
FIG. 6 is a block diagram of an example of a set of interconnected LSTM neural networks according to an embodiment.

FIG. 6 demonstrates that the LSTM neural network architecture may be structured as a set of interconnected LSTM neural networks. More particularly, an LSTM encoder 38 may receive the sequence 18 of historical maps. The illustrated LSTM encoder 38 is coupled to an LSTM decoder 40 that generates the sequence 20 of predictive maps. Experimental results indicate that 2-layer LSTMs with 256 and 128 hidden states, respectively, are able to capture moving objects and consistently perform correct prediction.

Figure 7:
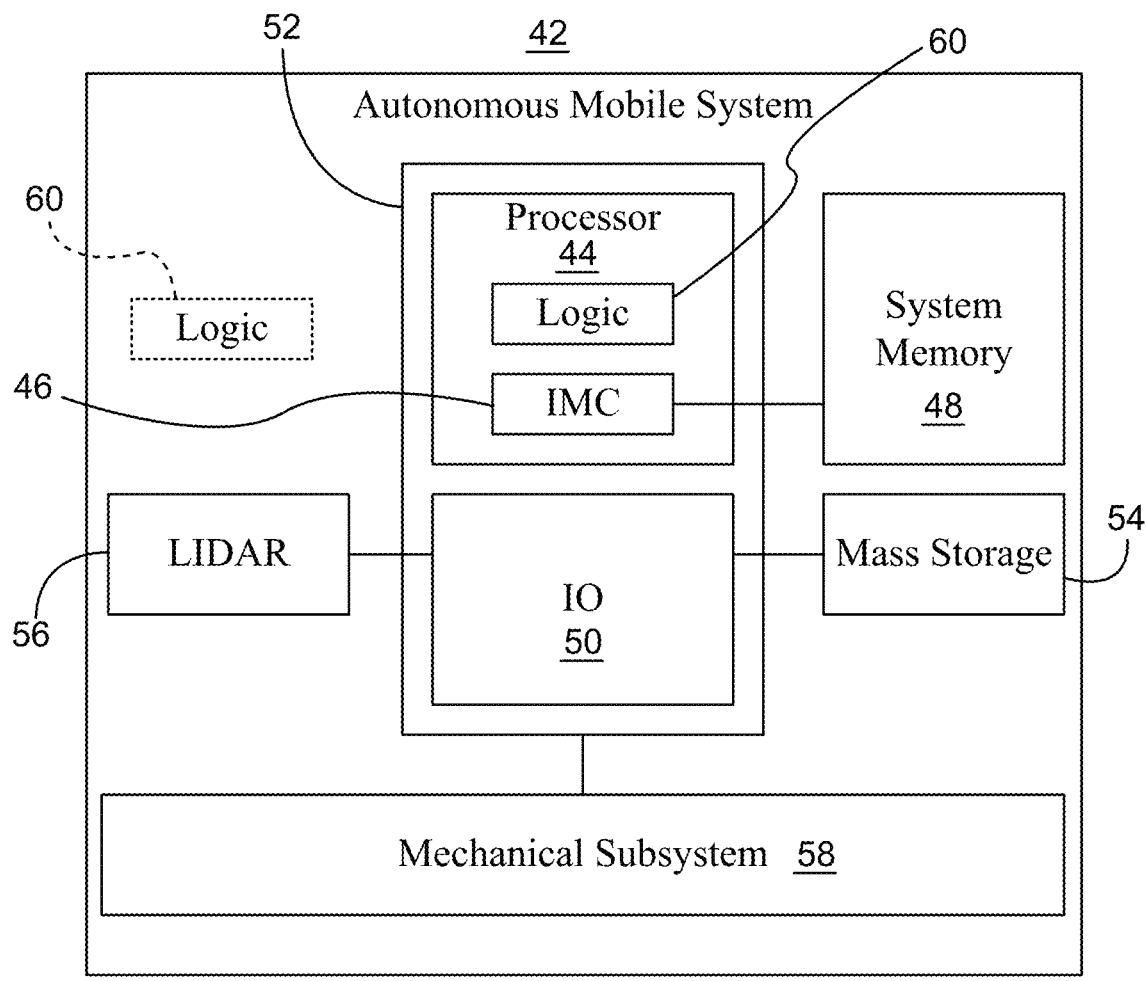
FIG. 7 is a block diagram of an example of an autonomous mobile system according to an embodiment.

Turning now to FIG. 7, a performance-enhanced autonomous mobile system 42 is shown. The mobile system 42 may be a robot, autonomous vehicle (e.g., car, van bus, aircraft, spacecraft), and so forth. In the illustrated example, the system 42 includes a host processor 44 (e.g., central processing unit/CPU) having an integrated memory controller (IMC) 46 that is coupled to a system memory 48.

The illustrated system 42 also includes an input output (IO) module 50 implemented together with the processor 44 on a semiconductor die 52 as a system on chip (SoC). The IO module 50 may function as a host device that communicates with, for example, a LIDAR 56 and mass storage 54 (e.g., hard disk drive/HDD, optical disk, solid state drive/SSD, flash memory). The die 52 may also be coupled to a mechanical subsystem 58 (e.g., wheels, drivetrain, internal combustion engines, fuel injectors, pumps, etc.) that enable the system 42 to move from one location to another.

The processor 44 may include logic 60 (e.g., logic instructions, configurable logic, fixed-functionality hardware logic, etc., or any combination thereof) that implements one or more aspects of the method 22 (FIG. 4), already discussed. Thus, the logic 60 may generate a sequence of predictive maps based on a sequence of historical maps obtained from the LIDAR 56, overlay the sequence of predictive maps on one another to obtain a map overlay, and apply an attenuation factor to the map overlay. In one example, the map overlay includes a grid of cells and each cell includes an occupation probability in accordance with the attenuation factor. Although the logic 60 is illustrated in the processor 44, the logic 60 may be located elsewhere in the mobile system 42.

Figure 8:
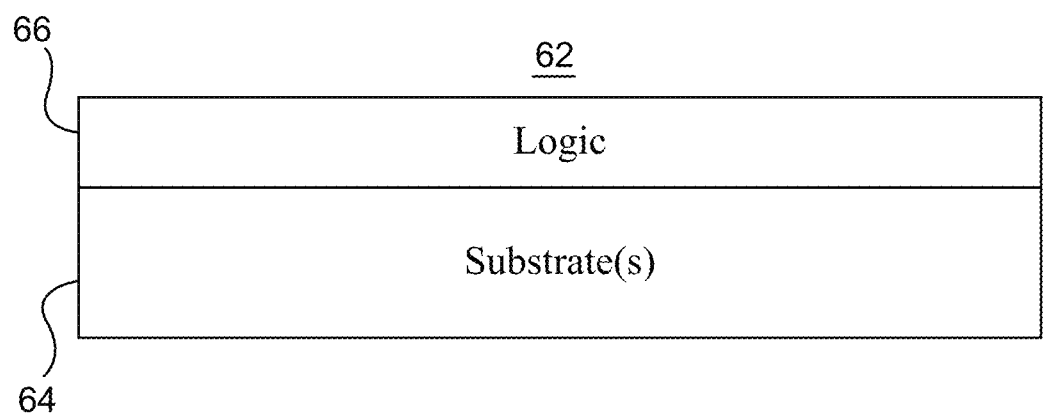
FIG. 8 is an illustration of an example of a semiconductor package apparatus according to an embodiment.

FIG. 8 shows a semiconductor package apparatus 62. The apparatus 62 may implement one or more aspects of the method 22 (FIG. 4) and may be readily substituted for the die 52 (FIG. 7), already discussed. The illustrated apparatus 62 includes one or more substrates 64 (e.g., silicon, sapphire, gallium arsenide) and logic 66 (e.g., transistor array and other integrated circuit/IC components) coupled to the substrate(s) 64. The logic 66 may be implemented at least partly in configurable logic or fixed-functionality hardware logic. In one example, the logic 66 includes transistor channel regions that are positioned (e.g., embedded) within the substrate(s) 64. Thus, the interface between the logic 66 and the substrate(s) 64 may not be an abrupt junction. The logic 66 may also be considered to include an epitaxial layer that is grown on an initial wafer of the substrate(s) 64.

Additional Notes and Examples

Example 1 may include a performance-enhanced autonomous mobile system comprising a detection and ranging subsystem to generate a sequence of historical maps, a mechanical subsystem, a processor coupled to the plurality of sensors and the mechanical subsystem, and a memory coupled to the processor, wherein the memory includes a set of instructions, which when executed by the processor, cause the autonomous mobile system to generate a sequence of predictive maps based on the sequence of historical maps, overlay the sequence of predictive maps on one another to obtain a map overlay, and apply an attenuation factor to the map overlay.

Example 2 may include the autonomous mobile system of Example 1, wherein the map overlay is to include a grid of cells and each cell is to include an occupation probability in accordance with the attenuation factor.

Example 3 may include the autonomous mobile system of Example 1, wherein the instructions, when executed, cause the autonomous mobile system to train a neural network on the sequence of historical maps to generate the sequence of predictive maps.

Example 4 may include the autonomous mobile system of Example 3, wherein a long short-term memory neural network is to be trained on the sequence of historical maps.

Example 5 may include the autonomous mobile system of any one of Examples 1 to 4, wherein the instructions, when executed, cause the autonomous mobile system to select a navigation path based on the map overlay.

Example 6 may include the autonomous mobile system of Example 5, wherein the navigation path is to be a real-time robot navigation path.

Example 7 may include a semiconductor package apparatus comprising one or more substrates, and logic coupled to the one or more substrates, wherein the logic is implemented at least partly in one or more of configurable logic or fixed-functionality hardware logic, the logic coupled to the one or more substrates to generate a sequence of predictive maps based on a sequence of historical maps, overlay the sequence of predictive maps on one another to obtain a map overlay, and apply an attenuation factor to the map overlay.

Example 8 may include the semiconductor package apparatus of Example 7, wherein the map overlay is to include a grid of cells and each cell is to include an occupation probability in accordance with the attenuation factor.

Example 9 may include the semiconductor package apparatus of Example 7, wherein the logic coupled to the one or more substrates is to train a neural network on the sequence of historical maps to generate the sequence of predictive maps.

Example 10 may include the semiconductor package apparatus of Example 9, wherein a long short-term memory neural network is to be trained on the sequence of historical maps.

Example 11 may include the semiconductor package apparatus of any one of Examples 7 to 10, wherein the logic coupled to the one or more substrates is to select a navigation path based on the map overlay.

Example 12 may include the semiconductor package apparatus of Example 11, wherein the navigation path is to be a real-time robot navigation path.

Example 13 may include a method of operating a performance-enhanced autonomous mobile system, comprising generating a sequence of predictive maps based on a sequence of historical maps, overlaying the sequence of predictive maps on one another to obtain a map overlay, and applying an attenuation factor to the map overlay.

Example 14 may include the method of Example 13, wherein the map overlay includes a grid of cells and each cell includes an occupation probability in accordance with the attenuation factor.

Example 15 may include the method of Example 13, wherein generating the sequence of predictive maps includes training a neural network on the sequence of historical maps.

Example 16 may include the method of Example 15, wherein a long short-term memory neural network is trained on the sequence of historical maps.

Example 17 may include the method of any one of Examples 13 to 16, further including selecting a navigation path based on the map overlay.

Example 18. The method of Example 17, wherein the navigation path is a real-time robot navigation path.

Example 19 may include at least one computer readable storage medium comprising a set of instructions, which when executed by a computing system, cause the computing system to generate a sequence of predictive maps based on a sequence of historical maps, overlay the sequence of predictive maps on one another to obtain a map overlay, and apply an attenuation factor to the map overlay.

Example 20 may include the at least one computer readable storage medium of Example 19, wherein the map overlay is to include a grid of cells and each cell is to include an occupation probability in accordance with the attenuation factor.

Example 21 may include the at least one computer readable storage medium of Example 19, wherein the instructions, when executed, cause the computing system to train a neural network on the sequence of historical maps to generate the sequence of predictive maps.

Example 22 may include the at least one computer readable storage medium of Example 21, wherein a long short-term memory neural network is to be trained on the sequence of historical maps.

Example 23 may include the at least one computer readable storage medium of Example 19, wherein the instructions, when executed, cause the computing system to select a navigation path based on the map overlay.

Example 24 may include the at least one computer readable storage medium of Example 23, wherein the navigation path is to be a real-time robot navigation path.

Example 25 may include a semiconductor package apparatus comprising means for generating a sequence of predictive maps based on a sequence of historical maps, means for overlaying the sequence of predictive maps on one another to obtain a map overlay, and means for applying an attenuation factor to the map overlay.

Example 26 may include the apparatus of Example 25, wherein the map overlay is to include a grid of cells and each cell is to include an occupation probability in accordance with the attenuation factor.

Example 27 may include the apparatus of Example 25, wherein the means for generating the sequence of predictive maps includes means for training a neural network on the sequence of historical maps.

Example 28 may include the apparatus of Example 27, wherein a long short-term memory neural network is to be trained on the sequence of historical maps.

Example 29 may include the apparatus of any one of Examples 25 to 28, further including means for selecting a navigation path based on the map overlay.

Example 30 may include the apparatus of Example 29, wherein the navigation path is to be a real-time robot navigation path.

Thus, technology described herein may generate predictive maps for autonomous navigation via LSTM neural networks and map overlays. The technology may equip robots and/or other mobile systems with the attribute of intelligence (e.g., anticipation of the future).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A mobile system comprising:
  a light detection and ranging (LIDAR) subsystem to generate a sequence of historical maps;
  a mechanical subsystem;
  a processor coupled to the light detection and ranging subsystem and the mechanical subsystem; and
  a memory coupled to the processor, wherein the memory includes a set of instructions, which when executed by the processor, cause the mobile system to:
    generate a sequence of predictive maps based on the sequence of historical maps;
    overlay the sequence of predictive maps on one another to obtain a map overlay; and
    apply an attenuation factor to the map overlay.

2. The mobile system of claim 1, wherein the map overlay is to include a grid of cells and each cell is to include an occupation probability in accordance with the attenuation factor.

3. The mobile system of claim 1, wherein the instructions, when executed, cause the mobile system to train a neural network on the sequence of historical maps to generate the sequence of predictive maps.

4. The mobile system of claim 3, wherein a long short-term memory neural network is to be trained on the sequence of historical maps.

5. The mobile system of claim 1, wherein the instructions, when executed, cause the mobile system to select a navigation path based on the map overlay.

6. The mobile system of claim 5, wherein the navigation path is to be a real-time robot navigation path.

7. A semiconductor package apparatus comprising:
  one or more substrates; and
  logic coupled to the one or more substrates, wherein the logic is implemented at least partly in one or more of configurable logic or fixed-functionality hardware logic, the logic coupled to the one or more substrates to:
    generate a sequence of predictive maps based on a sequence of historical maps,
    overlay the sequence of predictive maps on one another to obtain a map overlay, and
    apply an attenuation factor to the map overlay.

8. The semiconductor package apparatus of claim 7, wherein the map overlay is to include a grid of cells and each cell is to include an occupation probability in accordance with the attenuation factor.

9. The semiconductor package apparatus of claim 7, wherein the logic coupled to the one or more substrates is to train a neural network on the sequence of historical maps to generate the sequence of predictive maps.

10. The semiconductor package apparatus of claim 9, wherein a long short-term memory neural network is to be trained on the sequence of historical maps.

11. The semiconductor package apparatus of claim 7, wherein the logic coupled to the one or more substrates is to select a navigation path based on the map overlay.

12. The semiconductor package apparatus of claim 11, wherein the navigation path is to be a real-time robot navigation path.

13. A method comprising:
  generating a sequence of predictive maps based on a sequence of historical maps;
  overlaying the sequence of predictive maps on one another to obtain a map overlay; and
  applying an attenuation factor to the map overlay.

14. The method of claim 13, wherein the map overlay includes a grid of cells and each cell includes an occupation probability in accordance with the attenuation factor.

15. The method of claim 13, wherein generating the sequence of predictive maps includes training a neural network on the sequence of historical maps.

16. The method of claim 15, wherein a long short-term memory neural network is trained on the sequence of historical maps.

17. The method of claim 13, further including selecting a navigation path based on the map overlay.

18. The method of claim 17, wherein the navigation path is a real-time robot navigation path.

19. At least one computer readable storage medium comprising a set of instructions, which when executed by a computing system, cause the computing system to:
  generate a sequence of predictive maps based on a sequence of historical maps;
  overlay the sequence of predictive maps on one another to obtain a map overlay; and
  apply an attenuation factor to the map overlay.

20. The at least one computer readable storage medium of claim 19, wherein the map overlay is to include a grid of cells and each cell is to include an occupation probability in accordance with the attenuation factor.

21. The at least one computer readable storage medium of claim 19, wherein the instructions, when executed, cause the computing system to train a neural network on the sequence of historical maps to generate the sequence of predictive maps.

22. The at least one computer readable storage medium of claim 21, wherein a long short-term memory neural network is to be trained on the sequence of historical maps.

23. The at least one computer readable storage medium of claim 19, wherein the instructions, when executed, cause the computing system to select a navigation path based on the map overlay.

24. The at least one computer readable storage medium of claim 23, wherein the navigation path is to be a real-time robot navigation path.

* * * * *